US010527724B2

(12) United States Patent
Lodden et al.

(10) Patent No.: US 10,527,724 B2
(45) Date of Patent: Jan. 7, 2020

(54) COMPENSATION OF AN OPTICAL AIR DATA SYSTEM USING INERTIAL AIDING

(71) Applicant: Honeywell International Inc., Morris Plains, NJ (US)

(72) Inventors: Grant Hamilton Lodden, Minnetrista, MN (US); Matthew Wiebold, Northfield, MN (US)

(73) Assignee: Honeywell International Inc., Morris Plains, NJ (US)

( * ) Notice: Subject to any disclaimer, the term of this patent is extended or adjusted under 35 U.S.C. 154(b) by 203 days.

(21) Appl. No.: 15/846,805

(22) Filed: Dec. 19, 2017

(65) Prior Publication Data

US 2019/0187280 A1    Jun. 20, 2019

(51) Int. Cl.
*G01S 17/02* (2006.01)
*B64D 43/02* (2006.01)
*G01S 17/88* (2006.01)

(52) U.S. Cl.
CPC ............ *G01S 17/023* (2013.01); *B64D 43/02* (2013.01); *G01S 17/88* (2013.01)

(58) Field of Classification Search
CPC ........ G01S 17/023; G01S 17/88; B64D 43/02
USPC .......................................................... 701/14
See application file for complete search history.

(56) References Cited

U.S. PATENT DOCUMENTS

| 7,561,067 | B2 | 7/2009 | Matayoshi et al. | |
| 8,095,250 | B2 * | 1/2012 | Hanson | G01C 23/00 |
| | | | | 701/23 |
| 8,908,160 | B2 | 12/2014 | Dakin et al. | |
| 9,007,570 | B1 * | 4/2015 | Beyon | G01S 17/95 |
| | | | | 356/28.5 |
| 2013/0062457 | A1 * | 3/2013 | Deakin | B64B 1/08 |
| | | | | 244/25 |

(Continued)

FOREIGN PATENT DOCUMENTS

WO    2017068728 A1    4/2017

OTHER PUBLICATIONS

European Patent Office, "Extended European Search Report from EP Application No. 18213780.2 dated May 10, 2019", from Foreign Counterpart to U.S. Appl. No. 15/846,805, pp. 1-11, Published: EP.

*Primary Examiner* — Thomas G Black
*Assistant Examiner* — Wae L Louie
(74) *Attorney, Agent, or Firm* — Fogg & Powers LLC

(57) ABSTRACT

An air data system comprises an optical air data sensor onboard a vehicle, and includes an optical transceiver at a first location that is spaced apart from a second location on the vehicle corresponding to the vehicle center of gravity. The optical transceiver has at least one line-of-sight that is fixed relative to body axes of the vehicle, transmits light along the line-of-sight into an external interaction air region, and collects a scattered portion of the transmitted light. The system also includes onboard inertial sensors configured to measure rotation rates of the vehicle and generate rotation rate data. An onboard processor communicates with the air data sensor and the inertial sensors. The processor computes at least one line-of-sight velocity based on the collected scattered portion of the transmitted light, corrects the line-of-sight velocity for rotation rate induced bias, and computes air data parameters based on the corrected line-of-sight velocity.

18 Claims, 7 Drawing Sheets

(56) References Cited

U.S. PATENT DOCUMENTS

| | | | |
|---|---|---|---|
| 2013/0162974 A1* | 6/2013 | Dakin | G01N 21/53 356/28 |
| 2015/0210392 A1* | 7/2015 | Hodge | B64D 9/00 244/118.1 |
| 2017/0069214 A1* | 3/2017 | Dupray | G08G 5/0021 |
| 2018/0088238 A1* | 3/2018 | Garde | B64D 43/00 |
| 2018/0120439 A1* | 5/2018 | Garde | G01S 17/87 |
| 2018/0170571 A1* | 6/2018 | Garde | B64D 43/02 |
| 2018/0224299 A1* | 8/2018 | Wiebold | G01S 17/10 |
| 2018/0299558 A1 | 10/2018 | Sakamaki et al. | |
| 2019/0187280 A1* | 6/2019 | Lodden | B64D 43/02 |

* cited by examiner

COMPENSATION OF AN OPTICAL AIR DATA SYSTEM USING INERTIAL AIDING

BACKGROUND

Light Detection and Ranging (LiDAR) based air data is a promising technology that could ultimately augment or replace legacy air data systems on aircraft. A major advantage LiDAR based air data has over legacy technology is the fact that the airspeed accuracy is independent of measurement range. In particular, LiDAR air data systems can measure low and supersonic airspeeds accurately. This capability can expand mission profiles for fixed wing and rotary aircraft.

Current state of the art LiDAR air data systems are typically comprised of an optical transceiver and a processing line replaceable unit (LRU). The optical transceiver contains several optical assemblies designed to transmit and receive light at different angles or directions. A single transmit and receive pair is configured to form an optical line of sight (LoS) or an interaction region where the measurement is performed remotely or away from the aircraft body. While the remote measurement is advantageous for collecting air data parameters outside the boundary layer of the aircraft, this approach can result in a non-negligible measurement bias on platforms that exhibit high pitch, roll and yaw rates. For example, the bias induced in the calculated airspeed due to large pitch, roll and yaw rates may render LiDAR air data systems impractical for use on certain aircraft platforms.

SUMMARY

An air data system comprises an optical air data sensor onboard a vehicle, and includes an optical transceiver at a first location that is spaced apart from a second location on the vehicle corresponding to the vehicle center of gravity. The optical transceiver has at least one line-of-sight that is fixed relative to body axes of the vehicle. The optical transceiver is configured to transmit light along the at least one line-of-sight into an external interaction air region and collect a scattered portion of the transmitted light from the external interaction air region. The system also includes one or more inertial sensors onboard the vehicle. The inertial sensors are configured to measure one or more rotation rates of the vehicle and generate rotation rate data. A processor unit onboard the vehicle is in operative communication with the optical air data sensor and the inertial sensors. The processor unit is operative to execute instructions comprising computing at least one line-of-sight velocity based on the collected scattered portion of the transmitted light detected by the optical air data sensor; correcting the at least one line-of-sight velocity for rotation rate induced bias; and computing air data parameters based on the corrected at least one line-of-sight velocity.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for compensation of optical air data measurements for vehicles using inertial aiding are provided. The system and method incorporates an inertial aiding component with optical air data sensors, such as Light Detection and Ranging (LiDAR) sensors, to virtually eliminate the bias induced errors in calculating air speed due to vehicle rotation rates, such as large pitch, roll, and yaw rates. This greatly expands the types of platforms on which LiDAR sensors can be used, while providing improved performance of LiDAR sensors on all types of vehicles.

When implemented for a LiDAR air data system in an aircraft, the present approach combines knowledge of the aircraft rotation rates (pitch, roll, yaw) via inertial aiding, and the aircraft center of gravity location, to provide compensation or subtraction of the rotation rate induced bias from each line-of-sight of an optical transceiver in the air data system. Each line-of-sight of the optical transceiver is fixed relative to the aircraft body axes. Thus, the inertial aiding is used to compensate for movement of the air mass relative to each line-of-sight due to motion of the aircraft.

In addition, the inertial aiding can be used to provide a method to compensate for mechanically induced biases as a result of pitch, roll, and yaw of an aircraft.

The present system provides the benefit of enabling implementations of LiDAR-based air data systems on a broader array of aircraft platforms. For example, errors can be eliminated in computed air data parameters from a LiDAR system onboard aircraft platforms that exhibit high pitch, roll, and yaw rates, such as high performance jet aircraft.

Further details of the present system and method are described hereafter with reference to the drawings.

Figure 1:
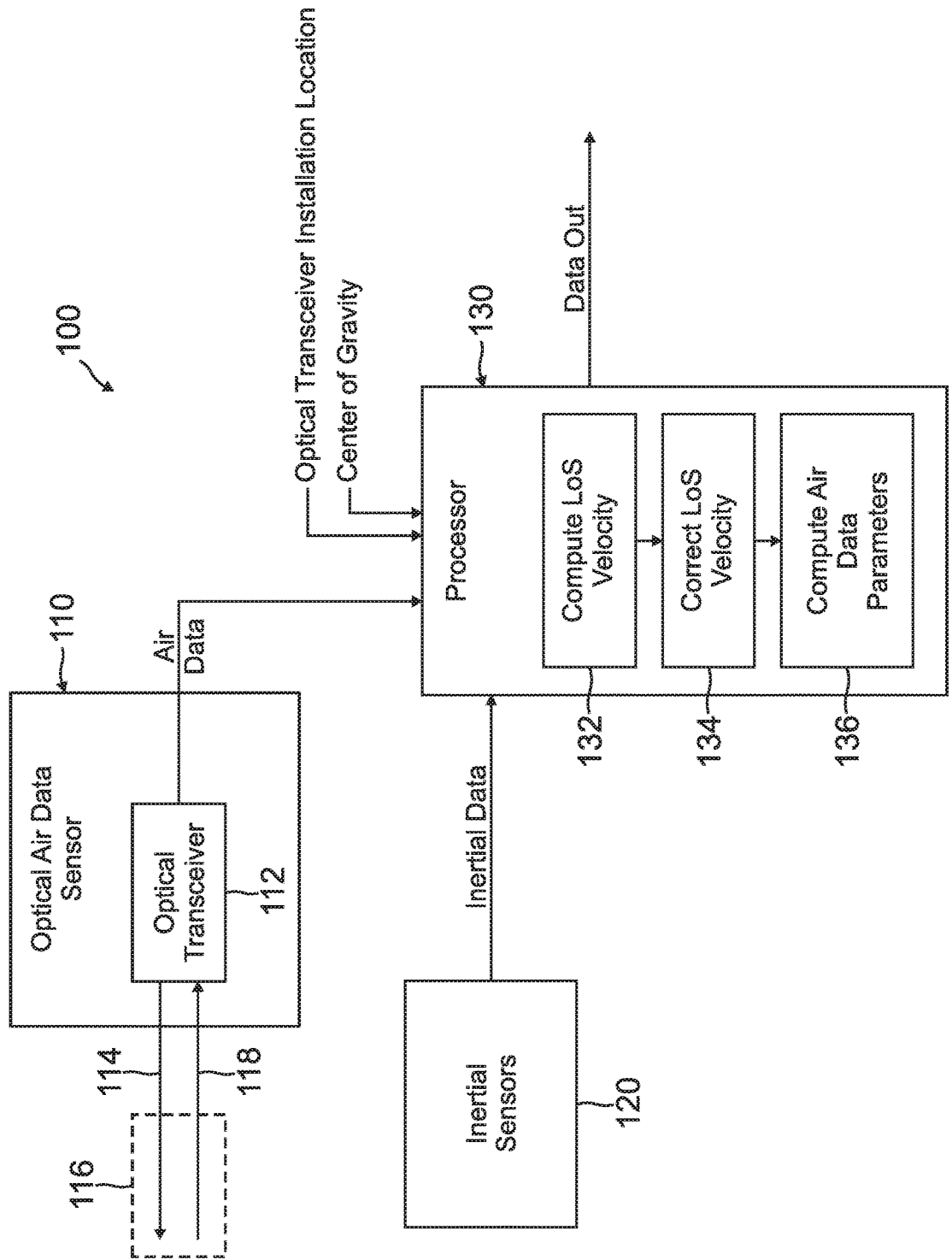
FIG. 1 is a block diagram of an optical air data system for a vehicle, according to one embodiment.

FIG. 1 is a block diagram of an optical air data system 100 for a vehicle, according to an exemplary embodiment. The air data system 100 comprises an optical air data sensor 110 that includes an optical transceiver 112 having at least one line-of-sight that is fixed relative to the body axes of the vehicle. In one embodiment, optical air data sensor 110 comprises a LiDAR air data sensor having multiple fixed lines-of-sight relative to the body axes of the vehicle. The optical transceiver 112 is positioned at an installation location on the vehicle that is spaced apart from the vehicle center of gravity. The optical transceiver 112 is configured to transmit light 114 into an external interaction air region 116 in the line-of-sight, and collect a scattered portion 118 of the transmitted light from interaction air region 116.

One or more inertial sensors 120 onboard the vehicle are configured to measure rotation rates of the vehicle to generate inertial data. In one embodiment, the inertial sensors can be implemented in an onboard inertial measurement unit (IMU). A processor unit 130 onboard the vehicle is in operative communication with optical air data sensor 110 and the inertial sensors 120. The processor unit 130 is configured to receive air data output by optical air data sensor 110, and to receive inertial data output by inertial sensors 120.

The processor unit 130 is operative to compute at least one line-of-sight (LoS) velocity (block 132), based on the collected scattered portion 118 of the transmitted light detected by optical air data sensor 110. The processor unit 130 corrects the LoS velocity for rotation rate induced bias (block 134), and computes air data parameters based on the corrected LoS velocity (block 136). The LoS velocity is corrected by a process that includes determining the rotation rate induced bias based on the inertial data (rotation rate data) from inertial sensors 120, the installation location of optical transceiver 112, and the vehicle center of gravity. The determined rotation rate induced bias is then subtracted from the LoS velocity. The computed air data parameters are then sent (data out) from processor unit 130 to other vehicle systems such as a vehicle computer for use in further vehicle data processing.

Figure 2:
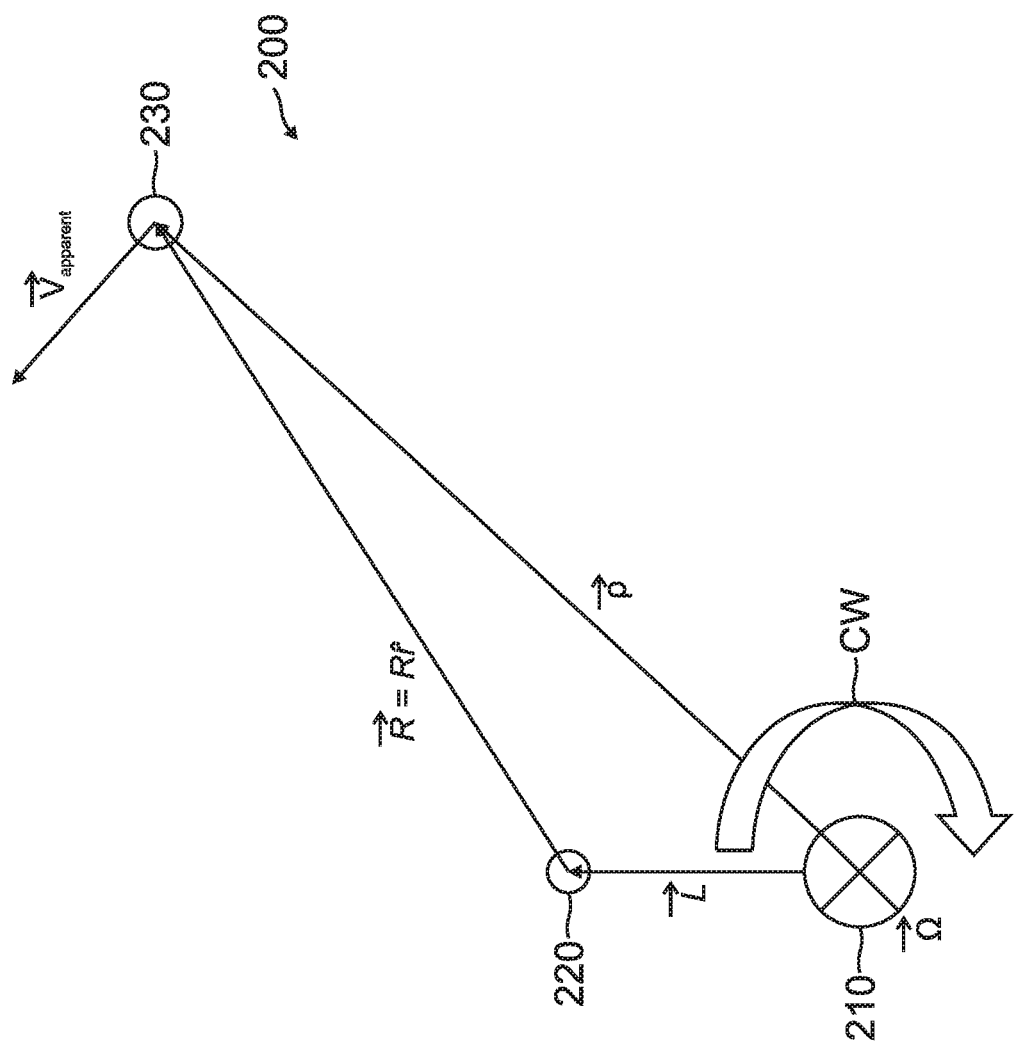
FIG. 2 is a vector diagram of the operation of an optical air data system subject to a rotation rate induced bias.

FIG. 2 is a vector diagram of the operation of an optical air data system subject to a rotation rate induced bias. The vector diagram 200 is referred to as follows to describe how the LoS velocity can be corrected for the rotation rate induced bias. As shown in FIG. 2, a vector $\vec{L}$ is defined from a vehicle center of gravity 210 to an optical transceiver location 220; a vector $\vec{R}$ is defined from optical transceiver location 220 to a measurement point 230 along the LoS; and a vector $\vec{\rho}$ is defined from center of gravity 210 to measurement point 230. The vector $\vec{R}$ can also be defined by scaling the unit vector for the LoS direction ($\hat{r}$) by a constant R as shown.

If it is assumed that the vehicle is rotating in the plane of the page clockwise (CW), this results in a rotation vector $\vec{\Omega}$. The apparent motion of air due to the rotation is represented by a vector $\vec{v}_{apparent}$, which is defined as:

$$\vec{v}_{apparent} = -\vec{\Omega} \times \vec{\rho} \quad (1)$$

From FIG. 2, the vector $\rho$ can be written as:

$$\vec{\rho} = \vec{L} + \vec{R} = \vec{L} + R\hat{r} \quad (2)$$

The apparent air motion as a result of rotation about the center of gravity can then be written as:

$$\vec{v}_{apparent} = -\vec{\Omega} \times (\vec{L} + R\hat{r}) \quad (3)$$

However, only the apparent velocity measured by the LoS is of interest, which is the portion of $v_{apparent}$ along the LoS or $v_{LoS}$. This is given by the expression:

$$v_{LoS} = \hat{r} \cdot \vec{v}_{apparent} = \hat{r} \cdot [-\vec{\Omega} \times (\vec{L} + R\hat{r})] \quad (4)$$

This expression (4) can be expanded as follows:

$$\hat{r} \cdot [-\vec{\Omega} \times (\vec{L} + R\hat{r})] = \hat{r} \cdot (\vec{L} \times \vec{\Omega}) + \hat{r} \cdot (R\hat{r} \times \vec{\Omega}) \quad (5)$$

To simplify, the last term in expression (5) is zero, therefore $v_{LoS}$ is given by the following expression:

$$v_{LoS} = \hat{r} \cdot (\vec{L} \times \vec{\Omega}) \quad (6)$$

The foregoing analysis holds for any general rotation vector, $\Omega$. Furthermore, this analysis demonstrates that if $\vec{L}$, the vector from the center of gravity to the optical transceiver, and $\vec{\Omega}$, the rotation vector, are known, the resulting bias, $v_{LoS}$, can be calculated and subtracted from the measured signal. The rotation vector $\vec{\Omega}$ can be realized via inertial sensors onboard the vehicle, and $\vec{L}$ can be deduced from knowledge of the optical transceiver installation location relative to the vehicle center of gravity.

Figure 3A:
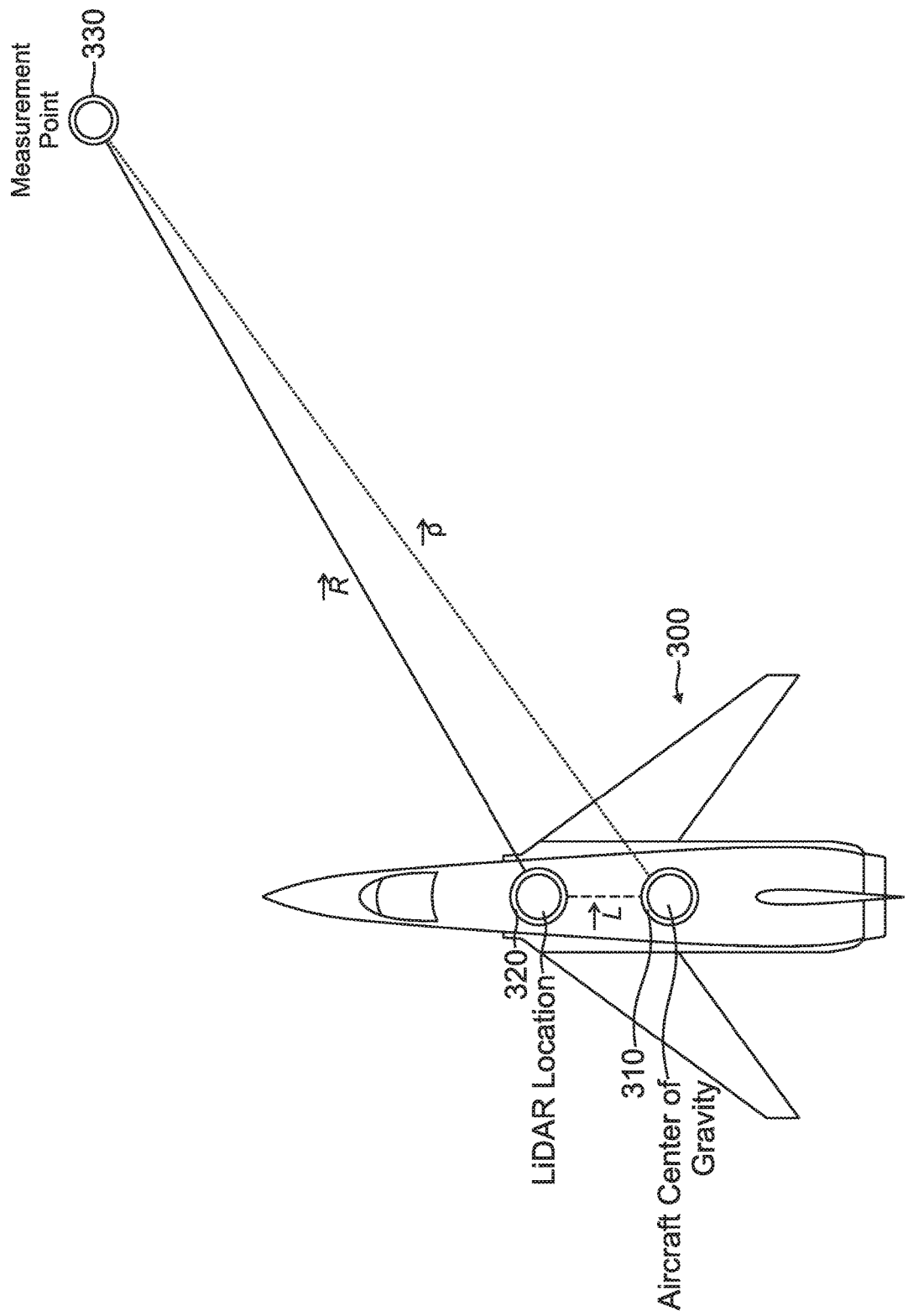
FIGS. 3A-3C are diagrams of an exemplary operation of a LiDAR air data system onboard an aircraft and subject to a rotation rate induced bias.
Figure 3B:
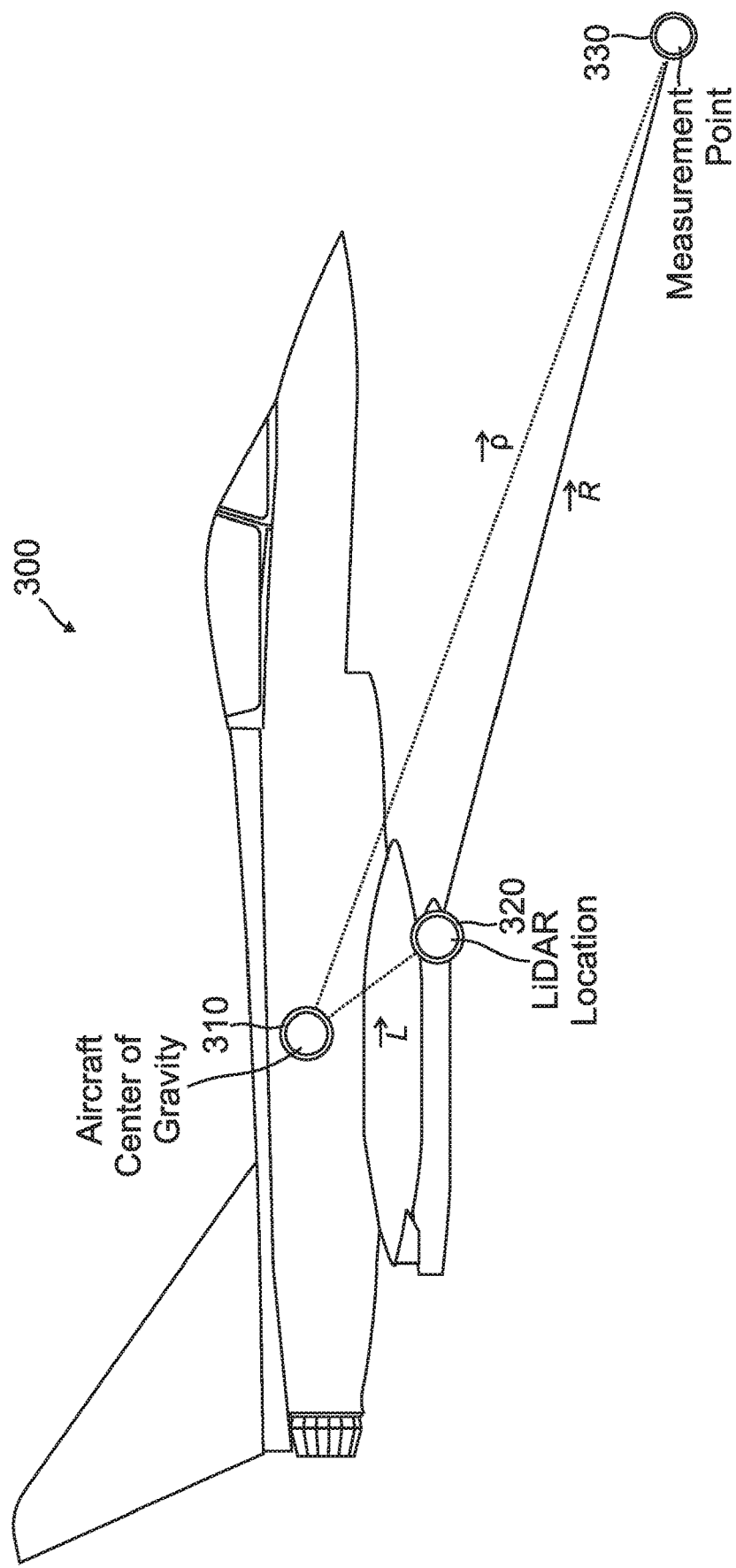
Figure 3C:
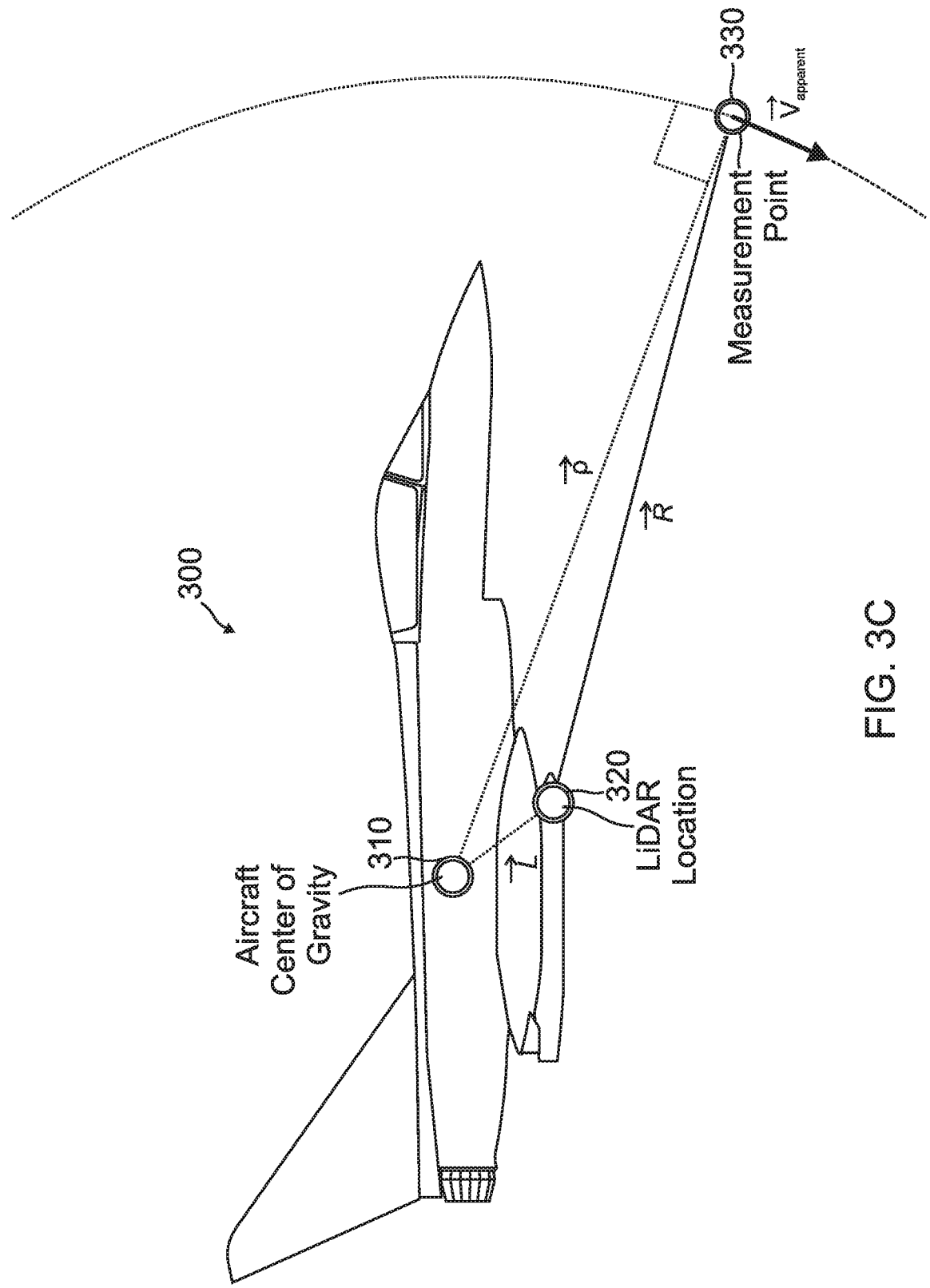

FIGS. 3A-3C illustrate the operation of a LiDAR air data system onboard an aircraft 300 and subject to a rotation rate induced bias. FIGS. 3A-3C are referred to as follows to describe how a LoS velocity can be corrected for rotation rate induced bias in the LiDAR air data system onboard aircraft 300. As shown, aircraft 300 has a center of gravity 310, and includes a LiDAR optical transceiver at an installation location 320 that is spaced apart from center of gravity 310. The optical transceiver has a fixed line-of-sight relative to the body axes of aircraft 300. A first vector $\vec{R}$ is defined from installation location 320 to a measurement point 330 along a single LoS of the optical transceiver, and a second vector $\vec{\rho}$ is defined from center of gravity 310 to measurement point 330.

Referring to FIG. 3C, suppose there is a nonzero pitch rate upwards for aircraft 300. The aircraft 300 will rotate around center of gravity 310 and there will be an apparent velocity of the air at the measurement point perpendicular to vector $\vec{\rho}$, and in the downwards direction as depicted by a vector $\vec{v}_{apparent}$. Since vector $\vec{\rho}$ and vector $\vec{R}$ are not collinear, there is a component of this apparent velocity along the line-of-sight (vector $\vec{R}$) that is detected by the air data system. This will result in a measurement bias in the calculated velocity along the line-of-sight, leading to biases in the air data, such as airspeed, angle of attack (AoA), and angle of sideslip (AoS), calculated by the air data system.

The present approach described above with respect to FIG. 2 can be used to compensate for the measurement bias in the air data system of aircraft 300. Since $\vec{L}$, the vector from the center of gravity to the optical transceiver, and $\vec{\Omega}$, the rotation vector, are known (FIG. 2), the resulting bias, can be calculated and subtracted from the measured signal. The rotation vector can be realized via inertial sensors such as an inertial measurement unit (IMU) onboard aircraft 300, and $\vec{L}$ can be deduced from knowledge of installation location 320 of the optical transceiver relative to center of gravity 310.

Figure 4:
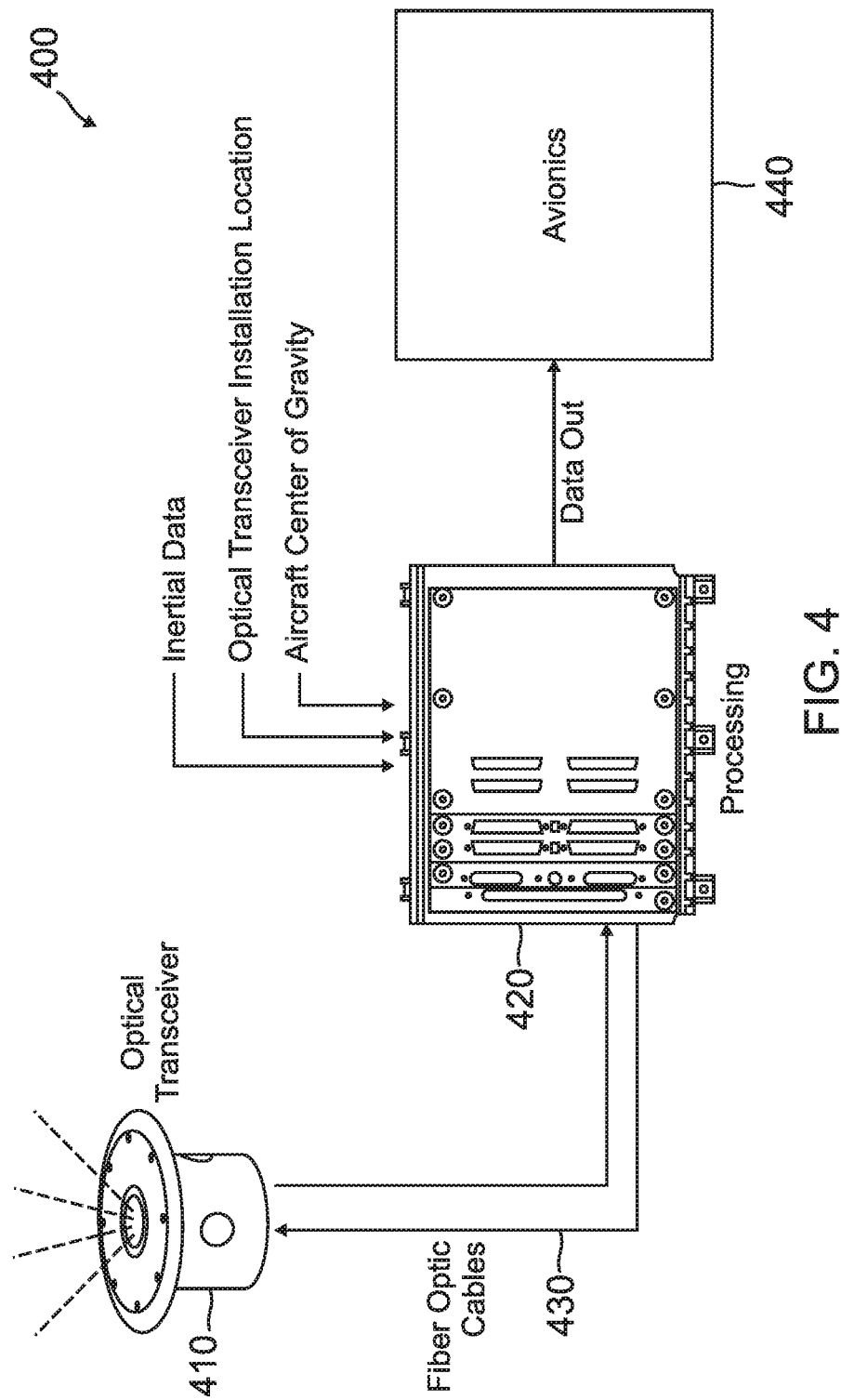
FIG. 4 illustrates one implementation of a LiDAR air data system for an aircraft.

FIG. 4 illustrates one implementation of a LiDAR air data system 400 for an aircraft such as aircraft 300. The air data system 400 comprises a LiDAR optical transceiver 410, which is positioned to have fixed lines-of-sight relative to the body axes of the aircraft. An onboard processing unit 420, such as a processing line replaceable unit (LRU), is in operative communication with optical transceiver 410, such as through a set of fiber optic cables 430. The processing unit 420 is operative to receive air data collected by optical transceiver 410, and to receive inertial data from one or more inertial sensors onboard the aircraft. The processing unit 420 is also operative to receive information related to the optical transceiver installation location and the aircraft center of gravity from other data sources (e.g., other aircraft systems, memory devices, etc.). Once the air data parameters are computed in processing unit 420 and the rotation induced bias is compensated, processing unit 420 outputs the corrected air data parameters to a data bus to be communicated to an onboard avionics unit 440, such as an avionics computer, other processors, or cockpit displays.

Figure 5:
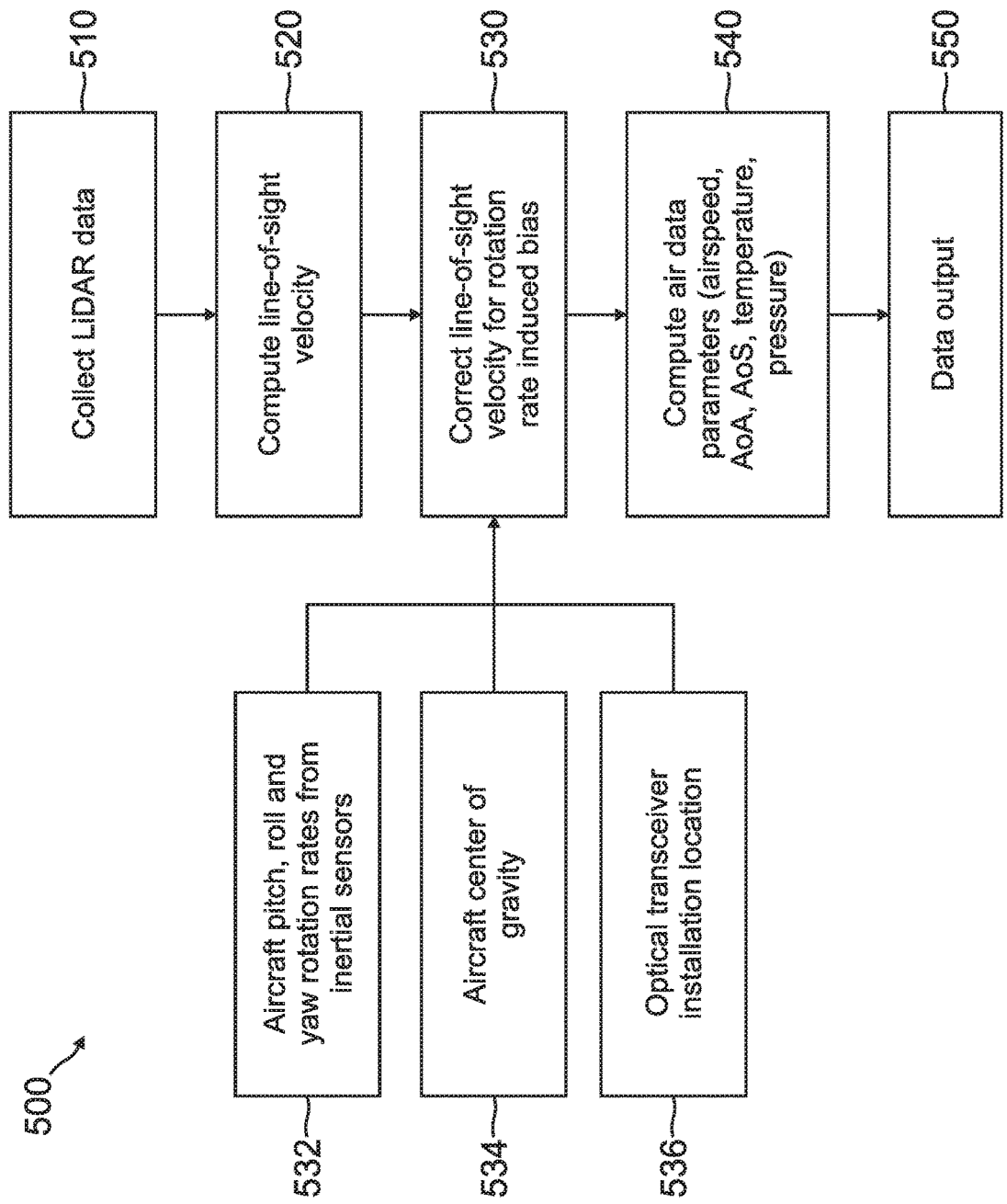
FIG. 5 is a flow diagram of a method for operating a LiDAR air data system for an aircraft, according to an exemplary implementation.

FIG. 5 is a flow diagram of a method 500 for operating a LiDAR air data system for an aircraft, according to an exemplary implementation. In method 500, the LiDAR data is collected (block 510), and used to compute a line-of-sight velocity (block 520). The method 500 then corrects the line-of-sight velocity for rotation rate induced bias (block 530). This correction is based on aircraft pitch, roll, and yaw rotation rates from onboard inertial sensors (block 532); the aircraft center of gravity (block 534); and the optical transceiver installation location (block 536). The method 500 then computes air data parameters (e.g., airspeed, AoA, AoS, temperature, pressure) (block 540) based on the corrected line-of-sight velocity. The computed air data parameters are then output to other aircraft systems (block 550), for further data processing in the operation of the aircraft, such as filtering, compensation, or like.

A processor used in the present system can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. Various process tasks can include controlling spatial scanning and orientation, laser operation, photodetector control and operation, and awareness of system orientation and state. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes an air data system, comprising: an optical air data sensor onboard a vehicle and including an optical transceiver at a first location that is spaced apart from a second location on the vehicle corresponding to the vehicle center of gravity, the optical transceiver having at least one line-of-sight that is fixed relative to body axes of the vehicle, wherein the optical transceiver is configured to transmit light along the at least one line-of-sight into an external interaction air region and collect a scattered portion of the transmitted light from the external interaction air region; one or more inertial sensors onboard the vehicle, the one or more inertial sensors configured to measure one or more rotation rates of the vehicle and generate rotation rate data; and a processor unit onboard the vehicle and in operative communication with the optical air data sensor and the one or more inertial sensors. The processor unit is operative to execute instructions comprising: computing at least one line-of-sight velocity based on the collected scattered portion of the transmitted light detected by the optical air data sensor; correcting the at least one line-of-sight velocity for rotation rate induced bias; and computing air data parameters based on the corrected at least one line-of-sight velocity.

Example 2 includes the system of Example 1, wherein the at least one line-of-sight velocity is corrected by a process comprising: determining the rotation rate induced bias based on the rotation rate data from the one or more inertial sensors, the first location of the optical transceiver, and the second location corresponding to the vehicle center of gravity; and subtracting the rotation rate induced bias from the at least one line-of-sight velocity.

Example 3 includes the system of any of Examples 1-2, wherein the optical air data sensor comprises a light detection and ranging (LiDAR) sensor having multiple fixed lines-of-sight relative to the body axes of the vehicle.

Example 4 includes the air data system of any of Examples 1-3, wherein the one or more inertial sensors are implemented in an inertial measurement unit (IMU).

Example 5 includes the system of any of Examples 1-4, wherein the vehicle comprises an aircraft.

Example 6 includes the system of Example 5, wherein the rotation rate data comprises a pitch rotation rate, a roll rotation rate, and a yaw rotation rate.

Example 7 includes the system of any of Examples 5-6, wherein the computed air data parameters comprise one or more of airspeed, angle of attack, angle of sideslip, temperature, or pressure.

Example 8 includes the system of any of Examples 5-7, wherein the processor unit is further operative to send the computed air data parameters to an avionics unit onboard the aircraft.

Example 9 includes a method of obtaining air data for a vehicle, the method comprising: providing an optical air data sensor onboard a vehicle, the optical air data sensor including an optical transceiver at a first location that is spaced apart from a second location on the vehicle corresponding to the vehicle center of gravity, the optical transceiver having at least one line-of-sight that is fixed relative to body axes of the vehicle; transmitting light, from the optical transceiver, along the at least one line-of-sight into an external interaction air region; receiving, in the optical transceiver, a scattered portion of the transmitted light from the external interaction air region to collect air data; sending the collected air data to a processor to compute at least one line-of-sight velocity based on the collected air data; determining a rotation rate induced bias for the at least one line-of-sight velocity based on rotation rate data from one or more inertial sensors onboard the vehicle, the first location of the optical transceiver, and the second location corresponding to the vehicle center of gravity; subtracting the rotation rate induced bias from the at least one line-of-sight velocity to provide a corrected at least one line-of-sight velocity; and computing air data parameters based on the corrected at least one line-of-sight velocity.

Example 10 includes the method of Example 9, wherein the optical air data sensor comprises a LiDAR sensor having multiple fixed lines of sight relative to the body axes of the vehicle.

Example 11 includes the method of any of Examples 9-10, wherein the vehicle comprises an aircraft.

Example 12 includes the method of Example 11, wherein the rotation rate data comprises a pitch rotation rate, a roll rotation rate, and a yaw rotation rate.

Example 13 includes the method of any of Examples 11-12, wherein the computed air data parameters comprise one or more of airspeed, angle of attack, angle of sideslip, temperature, or pressure.

Example 14 includes the method of any of Examples 11-13, further comprising: sending the computed air data parameters to an avionics unit onboard the aircraft.

Example 15 includes an optical air data system, comprising: a LiDAR sensor onboard an aircraft, the LiDAR sensor including an optical transceiver at a first location that is spaced apart from a second location on the aircraft corresponding to the aircraft center of gravity, the optical transceiver having at least one line-of-sight that is fixed relative to body axes of the vehicle, wherein the optical transceiver is configured to transmit light along the at least one line-of-sight into an external interaction air region and collect a scattered portion of the transmitted light from the external interaction air region; a plurality of inertial sensors onboard the aircraft, the inertial sensors configured to measure rotation rates of the aircraft and generate rotation rate data; and a processor unit onboard the aircraft, the processor unit in operative communication with the LiDAR sensor and the inertial sensors. The processor unit is operative to execute instructions comprising: computing at least one line-of-sight velocity based on the collected scattered portion of the transmitted light detected by the optical air data sensor; correcting the at least one line-of-sight velocity for rotation rate induced bias by a process comprising determining the rotation rate induced bias based on the rotation rate data from the inertial sensors, the first location of the optical transceiver, and the second location corresponding to the aircraft center of gravity, and subtracting the rotation rate induced bias from the at least one line-of-sight velocity; and computing air data parameters based on the corrected at least one line-of-sight velocity.

Example 16 includes the system of Example 15, wherein the rotation rate data generated by the inertial sensors comprises a pitch rotation rate, a roll rotation rate, and a yaw rotation rate.

Example 17 includes the system of any of Examples 15-16, wherein the computed air data parameters comprise one or more of airspeed, angle of attack, angle of sideslip, temperature, or pressure.

Example 18 includes the system of any of Examples 15-17, wherein the processor unit is further operative to send the computed air data parameters to an avionics unit onboard the aircraft.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An air data system, comprising:
   an optical air data sensor onboard a vehicle and including an optical transceiver at a first location that is spaced apart from a second location on the vehicle corresponding to the vehicle center of gravity, the optical transceiver having at least one line-of-sight that is fixed relative to body axes of the vehicle, wherein the optical transceiver is configured to transmit light along the at least one line-of-sight into an external interaction air region and collect a scattered portion of the transmitted light from the external interaction air region;
   one or more inertial sensors onboard the vehicle, the one or more inertial sensors configured to measure one or more rotation rates of the vehicle and generate rotation rate data; and
   a processor unit onboard the vehicle and in operative communication with the optical air data sensor and the one or more inertial sensors, the processor unit operative to execute instructions comprising:
   computing at least one line-of-sight velocity based on the collected scattered portion of the transmitted light detected by the optical air data sensor;
   correcting the at least one line-of-sight velocity for rotation rate induced bias; and
   computing air data parameters based on the corrected at least one line-of-sight velocity.

2. The system of claim 1, wherein the at least one line-of-sight velocity is corrected by a process comprising:
   determining the rotation rate induced bias based on the rotation rate data from the one or more inertial sensors, the first location of the optical transceiver, and the second location corresponding to the vehicle center of gravity; and
   subtracting the rotation rate induced bias from the at least one line-of-sight velocity.

3. The system of claim 1, wherein the optical air data sensor comprises a light detection and ranging (LiDAR) sensor having multiple fixed lines-of-sight relative to the body axes of the vehicle.

4. The air data system of claim 1, wherein the one or more inertial sensors are implemented in an inertial measurement unit (IMU).

5. The system of claim 1, wherein the vehicle comprises an aircraft.

6. The system of claim 5, wherein the rotation rate data comprises a pitch rotation rate, a roll rotation rate, and a yaw rotation rate.

7. The system of claim 5, wherein the computed air data parameters comprise one or more of airspeed, angle of attack, angle of sideslip, temperature, or pressure.

8. The system of claim 5, wherein the processor unit is further operative to send the computed air data parameters to an avionics unit onboard the aircraft.

9. A method of obtaining air data for a vehicle, the method comprising:
   providing an optical air data sensor onboard a vehicle, the optical air data sensor including an optical transceiver at a first location that is spaced apart from a second location on the vehicle corresponding to the vehicle center of gravity, the optical transceiver having at least one line-of-sight that is fixed relative to body axes of the vehicle;
   transmitting light, from the optical transceiver, along the at least one line-of-sight into an external interaction air region;

receiving, in the optical transceiver, a scattered portion of the transmitted light from the external interaction air region to collect air data;

sending the collected air data to a processor to compute at least one line-of-sight velocity based on the collected air data;

determining a rotation rate induced bias for the at least one line-of-sight velocity based on rotation rate data from one or more inertial sensors onboard the vehicle, the first location of the optical transceiver, and the second location corresponding to the vehicle center of gravity;

subtracting the rotation rate induced bias from the at least one line-of-sight velocity to provide a corrected at least one line-of-sight velocity; and computing air data parameters based on the corrected at least one line-of-sight velocity.

10. The method of claim 9, wherein the optical air data sensor comprises a light detection and ranging (LiDAR) sensor having multiple fixed lines of sight relative to the body axes of the vehicle.

11. The method of claim 9, wherein the vehicle comprises an aircraft.

12. The method of claim 11, wherein the rotation rate data comprises a pitch rotation rate, a roll rotation rate, and a yaw rotation rate.

13. The method claim 11, wherein the computed air data parameters comprise one or more of airspeed, angle of attack, angle of sideslip, temperature, or pressure.

14. The method of claim 11, further comprising:
sending the computed air data parameters to an avionics unit onboard the aircraft.

15. An optical air data system, comprising:
a light detection and ranging (LiDAR) sensor onboard an aircraft, the LiDAR sensor including an optical transceiver at a first location that is spaced apart from a second location on the aircraft corresponding to the aircraft center of gravity, the optical transceiver having at least one line-of-sight that is fixed relative to body axes of the vehicle, wherein the optical transceiver is configured to transmit light along the at least one line-of-sight into an external interaction air region and collect a scattered portion of the transmitted light from the external interaction air region;

a plurality of inertial sensors onboard the aircraft, the inertial sensors configured to measure rotation rates of the aircraft and generate rotation rate data; and a processor unit onboard the aircraft, the processor unit in operative communication with the LiDAR sensor and the inertial sensors, the processor unit operative to execute instructions comprising:
 computing at least one line-of-sight velocity based on the collected scattered portion of the transmitted light detected by the optical air data sensor;
 correcting the at least one line-of-sight velocity for rotation rate induced bias by a process comprising:
  determining the rotation rate induced bias based on the rotation rate data from the inertial sensors, the first location of the optical transceiver, and the second location corresponding to the aircraft center of gravity; and
  subtracting the rotation rate induced bias from the at least one line-of-sight velocity; and
 computing air data parameters based on the corrected at least one line-of-sight velocity.

16. The system of claim 15, wherein the rotation rate data generated by the inertial sensors comprises a pitch rotation rate, a roll rotation rate, and a yaw rotation rate.

17. The system of claim 15, wherein the computed air data parameters comprise one or more of airspeed, angle of attack, angle of sideslip, temperature, or pressure.

18. The system of claim 15, wherein the processor unit is further operative to send the computed air data parameters to an avionics unit onboard the aircraft.

* * * * *